United States Patent
Kuo et al.

(10) Patent No.: US 7,208,867 B2
(45) Date of Patent: Apr. 24, 2007

(54) FOCUSING STRUCTURE FOR ELECTRON SOURCE

(75) Inventors: Huei-Pei Kuo, Cupertino, CA (US);
Henryk Birecki, Palo Alto, CA (US);
Si-Ty Lam, Pleasanton, CA (US);
Steven Louis Naberhuis, Fremont, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 10/891,277

(22) Filed: Jul. 14, 2004

(65) Prior Publication Data
US 2005/0001530 A1    Jan. 6, 2005

Related U.S. Application Data

(62) Division of application No. 09/795,240, filed on Feb. 27, 2001, now Pat. No. 6,815,875.

(51) Int. Cl.
*H01J 1/02* (2006.01)

(52) U.S. Cl. .................................... 313/497; 313/310

(58) Field of Classification Search ............... 313/336, 313/351, 495, 497, 306–310
See application file for complete search history.

(56) References Cited

U.S. PATENT DOCUMENTS

| 4,500,791 | A | * | 2/1985 | Beisswenger | ............ 250/493.1 |
| 5,070,282 | A | | 12/1991 | Epsztein | |
| 5,414,272 | A | | 5/1995 | Watanabe et al. | |
| 5,430,347 | A | | 7/1995 | Kane et al. | |
| 5,557,596 | A | * | 9/1996 | Gibson et al. | ............. 369/101 |
| 5,850,120 | A | * | 12/1998 | Okamoto | ................... 313/336 |
| 5,898,258 | A | * | 4/1999 | Sakai et al. | ................ 313/309 |
| 6,190,223 | B1 | * | 2/2001 | Tjaden et al. | ................. 445/24 |
| 6,285,118 | B1 | * | 9/2001 | Hatai et al. | ................ 313/310 |
| 6,300,713 | B1 | * | 10/2001 | Xia | ........................... 313/497 |
| 6,498,426 | B1 | * | 12/2002 | Watabe et al. | ............. 313/310 |
| 6,515,640 | B2 | * | 2/2003 | Tsukamoto et al. | ........ 345/75.2 |

FOREIGN PATENT DOCUMENTS

| EP | 0772218 | * | 5/1997 |
| EP | 0913849 | | 8/1998 |
| EP | 1003195 | * | 5/2000 |
| EP | 1037250 | * | 9/2000 |
| EP | 1069587 | * | 1/2001 |
| JP | 08087956 | * | 2/1996 |
| JP | 2000294122 | * | 10/2000 |
| JP | 2001035354 | * | 2/2005 |

OTHER PUBLICATIONS

Jon William Toigo, "Avoiding a data crunc", Scintific American, vol. 282, No. 5, May 2000. p. 72.*
Sheng et al: "Quasi-Ballistic Stable Electron Emission from Porous Silicon Cold Cathodes" Mat. Res. Soc. Symp. Proc. vol. 509, 1998 Materials Research Society.

* cited by examiner

Primary Examiner—Ashok Patel (57) ABSTRACT

An electron source includes a planar emission region for generating an electron emission, and a focusing structure for focusing the electron emission into an electron beam.

1 Claim, 13 Drawing Sheets

FOCUSING STRUCTURE FOR ELECTRON SOURCE

This application is a division of U.S. patent application Ser. No. 09/795,240, filed Feb. 27, 2001, now U.S. Pat. No. 6,815,875.

BACKGROUND OF THE INVENTION

The present invention relates generally to electron sources. More specifically, the present invention relates to semiconductor-based electron sources.

Semiconductor-based electron sources that generate focused electron beams may be used for information storage devices, lithographic applications, and other devices using such focused electron beams. Consider the example of storage devices. For decades researchers have been working to increase storage density and reduce storage cost of information storage devices such as magnetic hard-drives, optical drives, and semiconductor random access memory. However, increasing the storage density is becoming increasingly difficult because conventional technologies appear to be approaching fundamental limits on storage density. For instance, information storage based on conventional magnetic recording is rapidly approaching fundamental physical limits such as the superparamagnetic limit, below which magnetic bits are not stable at room temperature.

Storage devices that do not face these fundamental limits are being researched. An example of such an information storage device is described in U.S. Pat. No. 5,557,596. The device includes multiple electron sources having electron emission surfaces that are proximate a storage medium. During write operations, the electron sources bombard the storage medium with relatively high intensity electron beams. During read operations, the electron sources bombard the storage medium with relatively low intensity electron beams.

Size of storage bits in such devices may be reduced by decreasing the electron beam diameter. Reducing the storage bit size increases storage density and capacity and decreases storage cost.

One type of electron source typically used in displays includes a multitude of "Spindt" emitters. A Spindt emitter could be used for generating focused electron beams for data storage devices, lithographic applications, and other applications using such focused electron beams. A Spindt emitter has a cone shape and emits an electron beam at the tip of its cone. The cone tip is made as sharp as possible to reduce operating voltage and achieve a small electron beam diameter.

However, there are problems associated with Spindt emitters. Fabrication of sharp emitter tips is difficult and expensive. Focusing the electron beam from a Spindt tip in a temporally and spatially stable manner is difficult. The electron optics that provide the focusing can become complicated. Moreover, Spindt emitters do not operate well in poor vacuums. These problems become especially prominent as the electron beam diameter is reduced below 100 nanometers.

It would be desirable to reduce fabrication cost and improve stability and operability of the electron source, whether a single emitter or a multitude of emitters. It would also be desirable to decrease the electron beam diameter.

SUMMARY OF THE INVENTION

According to one aspect of the present invention, an electron source includes a planar emission region; and a focusing structure for the emission region. Other aspects and advantages of the present invention will become apparent from the following detailed description, taken in conjunction with the accompanying drawings, illustrating by way of example the principles of the present invention.

DETAILED DESCRIPTION

Figure 1:
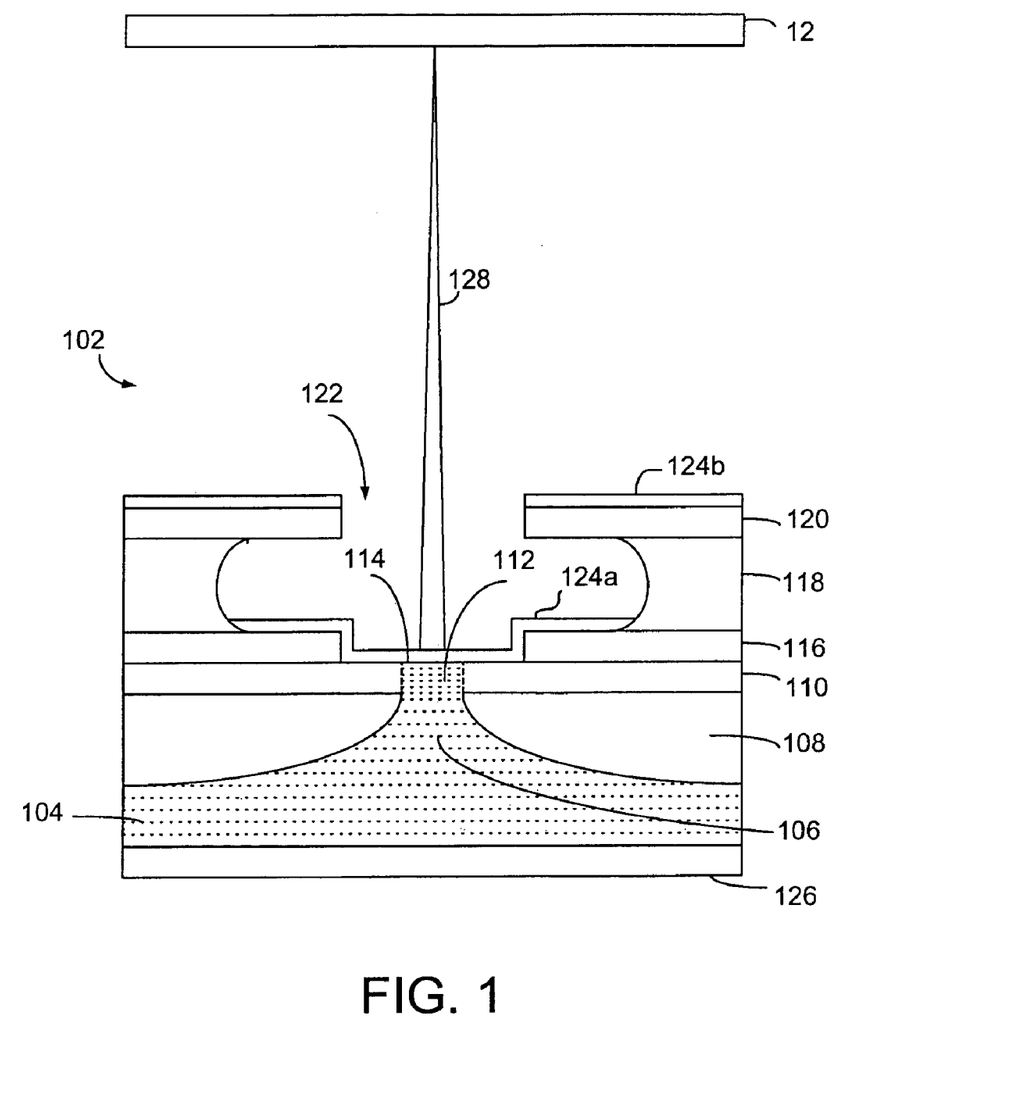
FIG. 1 is an illustration of an electron source in accordance with the present invention.

Referring to FIG. 1, an electron source 102 includes a substrate 104 that may be made of silicon. A portion of the substrate 104 is etched away, leaving an "active" region 106. The active region 106 has a volcano-like, funnel-like or nozzle-like geometry: a wide base that quickly narrows into a neck.

This active region 106 is surrounded by an isolation region 108. The isolation region 108 gives the specific geometry to the active region 106. The isolation region 108 may also isolate the active region 106 from neighboring active regions. However, bases of the active regions 106 of contiguous electron sources 102 may be connected together.

A semiconductor layer 110 is formed atop the substrate 104. The semiconductor layer 110 may be made of a material such as polysilicon or silicon carbide (SiC). An upper surface of the semiconductor layer 110 is planar.

A region 112 of the semiconductor layer 110 is porous. The porous region 112 is aligned with the neck of the volcano-shaped active region 106 and terminates at the planar surface of the semiconductor layer 110 to define an emission region 114 at the planar surface. Thus, the emission region 114 is also planar. Making the emission region 114 planar allows for better focusing of the electron beam. Limiting the area of the emission region 114, as described below, allows higher current densities because thermal energy dissipation is increased. The area of emission region 114 may be limited to less than 1% of the total area available for emission.

The electron source 102 further includes an emission electrode 116 on the semiconductor layer 110, an insulating layer 118 on the emission electrode 116 and a lens electrode 120 on the insulating layer 118. The insulating layer 118 isolates the emission electrode 116 from the lens electrode 120. An aperture 122 extends through the lens electrode 120, the insulating layer 118 and the emission electrode 116 and exposes the emission region 114. The emission region 114 is no more than 95% of the size of the aperture 122. Still, a wide range of dimensions may be used for the opening 122.

A conductive layer 124 may cover portions of the emission region 114, the emission electrode 116, and the lens electrode 120. A first portion 124a of the conductive layer 124 covers the emission region 114 and portions of the emission electrode 116, and a second portion 124b of the conductive layer 124 covers the lens electrode 120. Since the porous silicon region 112 is not very conductive, the first portion 124a provides a contact over the emission region 114 and allows an electric field to be applied over the emission region 114. A wide range of spacings between the first portion 124a and the lens electrode 120 may be used.

The conductive layer 124 may be an alloy that does not form an insulating oxide or nitride on its surface. The conductive layer 124 may be made of a thin metal or conductive material such as gold, carbon (for example graphite or electrically conductive diamond or combinations thereof), platinum, iridium, rhodium, boron nitride or other conductors or semiconductors. Materials having atomic numbers substantially below that of gold may also be used for the conductive layer 124. As a low atomic number element, carbon exhibits very low electron scattering probability, a property that can increase the electron emission efficiency and reduce the energy spread of the emitted electrons.

The conductive layer 124 may be porous or semi-dense such that all conductive areas are electrically connected. For example, the conductive layer 124 may include electrically interconnected conductive islands, a mesh of interconnected filaments, or a combination of the two.

A back contact 126 may be formed on the opposite side of the substrate 104. The back contact establishes an equipotential surface for the internal field in the semiconductor substrate 104 and the porous silicon region 112. The back contact 126 may be eliminated if the substrate 104 is highly doped, in which case a contact can be made to the substrate 104 via a front contact.

During operation, different potentials are applied to the substrate 104, the emission electrode 116, the lens electrode 120 and the back contact 126. The resulting emission electrode voltage causes-electrons to be injected from the substrate 104 into the porous region 112 and emitted from the emission region 114 and through the first portion 124a of the conductive layer 124. The electric field resulting from the electron lens voltage at the opening 122 causes the emitted electrons to be focused into an electron beam 128. The focus of the electron beam 128 may be adjusted by varying the potential applied to the lens electrode 120. The electron beam 128 can be focused to a very small spot size (e.g., less than one nanometer in diameter) on a target 12 (e.g., a storage medium).

Drivers for applying the potentials to the substrate 104 and the electrodes 116 and 120 may be on-chip or off-chip.

Figure 2:
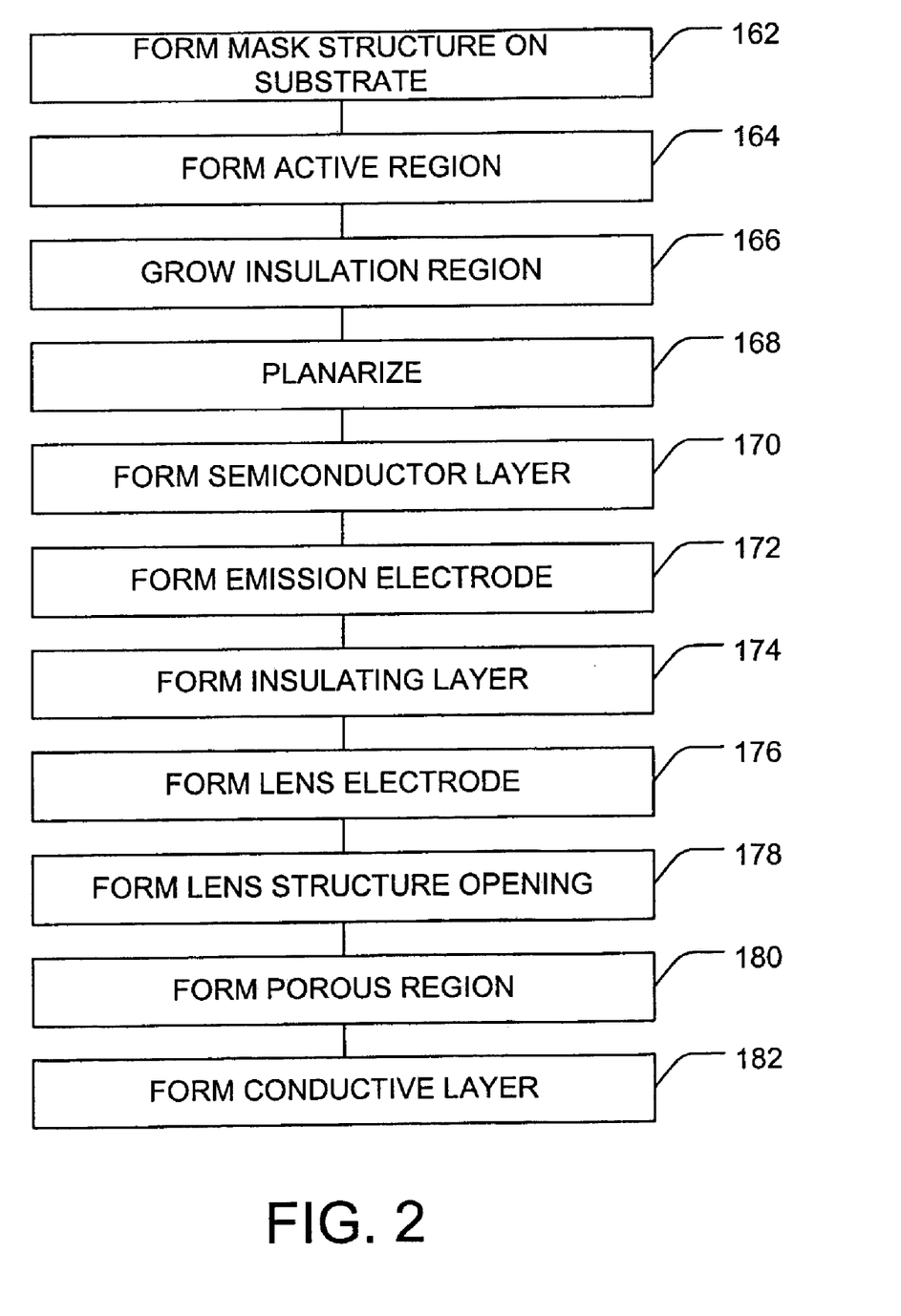
FIG. 2 is a flowchart of a method of fabricating the electron source shown in FIG. 1.

FIG. 2 summarizes a possible method of manufacturing the electron source 102. A mask stack is formed atop a surface of a substrate 104 by depositing a pad oxide layer on the substrate and depositing a chromium layer on the pad oxide layer (step 162).

The chromium layer is patterned and the substrate is etched to form an active region 106 (step 164). An insulating layer is grown to insulate the active region 106 (step 166) and the resulting structure is planarized (step 168).

A semiconductor layer 110 is deposited on the planarized surface (step 170). Consequently, the semiconductor layer 110 is also planar.

An emission electrode 116 is formed atop the semiconductor layer 110 (step 172). For example, the emission electrode 116 may be-formed by depositing a chromium (Cr) layer on the semiconductor layer 110.

An insulating layer 118 is formed atop the emission electrode 116 (step 174). The insulating layer 118 may be an oxide layer.

A lens electrode 120 is formed atop the insulating layer 118 (step 176). For example, the lens electrode 120 may be formed by depositing a chromium (Cr) layer on the insulating layer 118.

An opening 122 is formed in the lens electrode 120, the insulating layer 118 and the emission electrode 116 (step 178). The insulating layer 118 may be recessed to avoid interference with the electron beam. The opening 122 extends to the semiconductor layer 110. Thus, the opening exposes an emission region 114.

A region 112 of the semiconductor layer 110 may be made porous (step 180) by a process such as anodization. A conductive layer 124 is then formed on the emission region 114 and the electrodes 116 and 120 (step 182).

The porous region 112 may also be patterned to form a plurality of separate emission regions. During operation, the separate emission regions may be addressed simultaneously or selectively.

Figure 3:
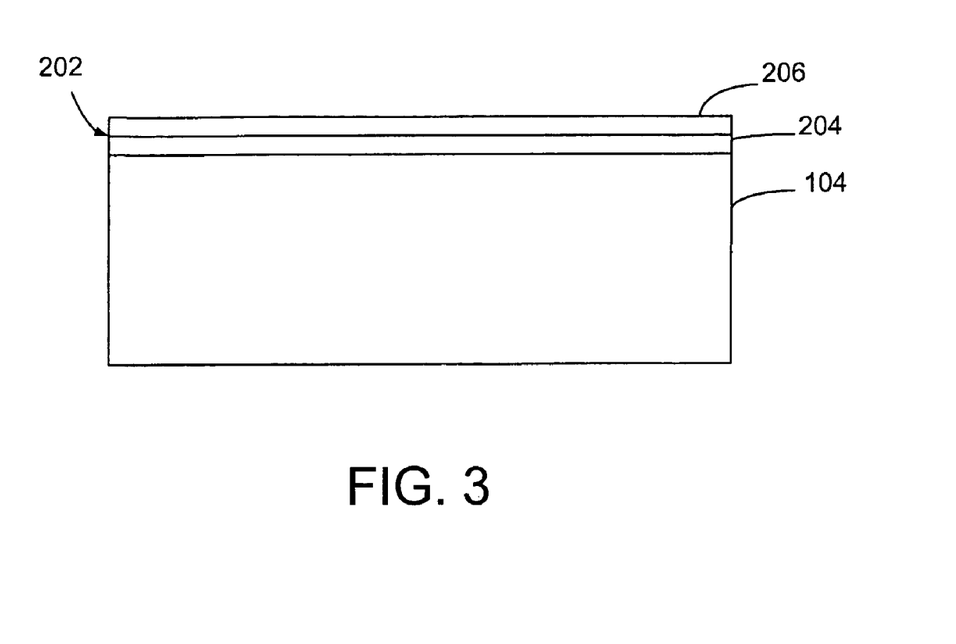
FIG. 3 is an illustration of a structure following the deposition of a mask stack on an upper surface of a substrate.

FIGS. 3 to 14 show the electron source 102 during the various stages of an exemplary fabrication process. FIG. 3 illustrates a silicon substrate 104 and a mask stack 202 formed atop a surface of the substrate 104. The substrate 104 may be an n++ type silicon substrate having a resistivity range of less than 0.01 ohm-cm. The mask stack 202 may include a pad oxide layer 204 and a mask material layer 206. The pad oxide layer 204 may be formed by growing a silicon dioxide layer on the substrate surface using a wet or dry oxidation technique.

Figure 4A:
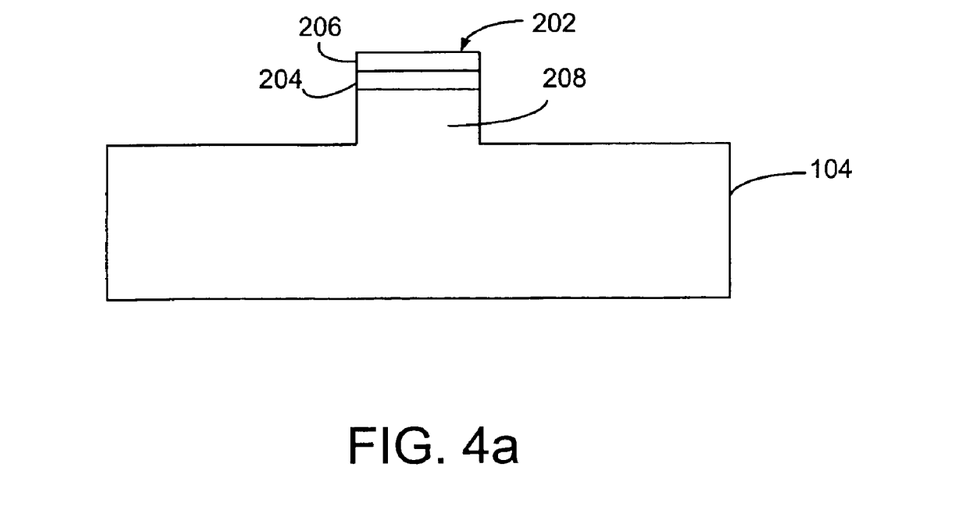
FIG. 4a is an illustration of the structure after the mask stack has been patterned and etched to expose a mesa structure.
Figure 4B:
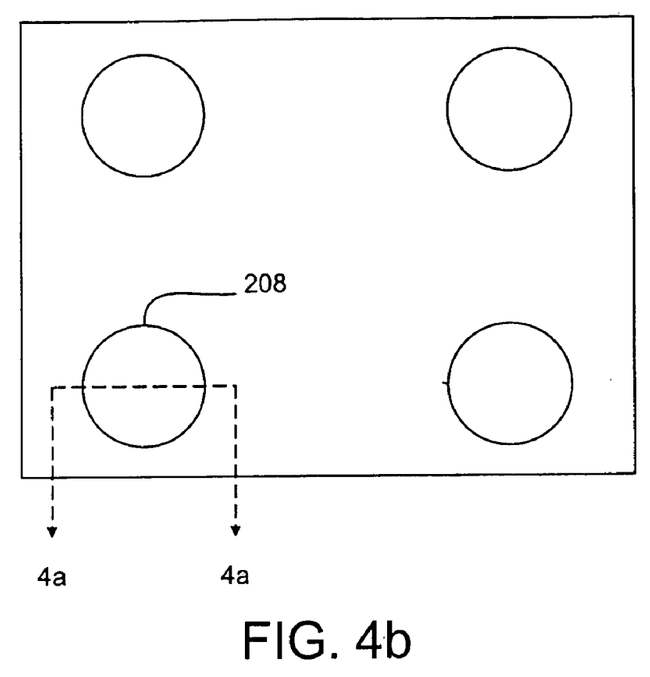
FIG. 4b is a top view of a pattern array for the mask stack.

Referring to FIG. 4a, the mask stack 202 may be patterned by conventional photolithographic techniques, and an active device region 208 having a mesa shape may be etched in the substrate 104 in accordance with the dimensions and location defined by the patterned mask stack 202. A dry etch technique may be used to form the active device region 208. The active region 208 may be cylindrical as illustrated in FIG. 4*b*. Such an active region 208 may have a diameter of many micrometers or preferably one to two micrometers.

Figure 4C:
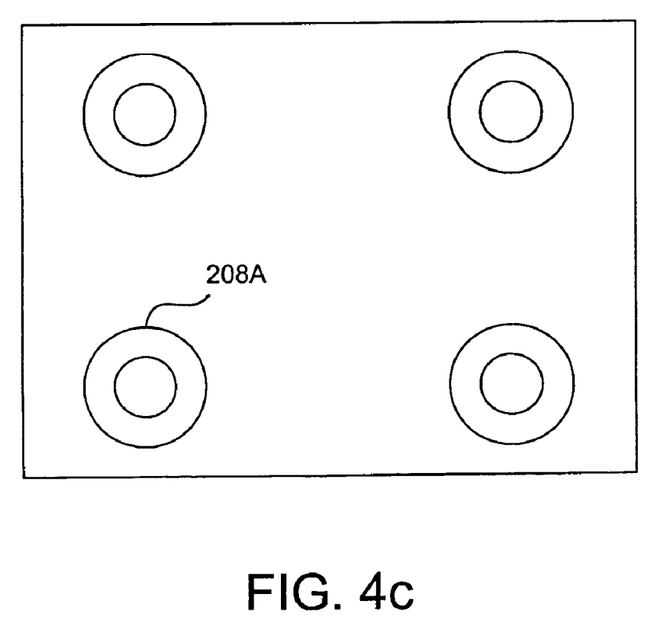
FIG. 4c is a top view of an alternative pattern array for the mask stack.

The active region 208 is not limited to a cylindrical shape. For example, the active region may have the hollow circular shape shown in FIG. 4*c*. FIGS. 4*b* and 4*c* also illustrate that a plurality of electron sources (each electron source being individually addressable) may be fabricated simultaneously on a single-substrate.

Figure 5:
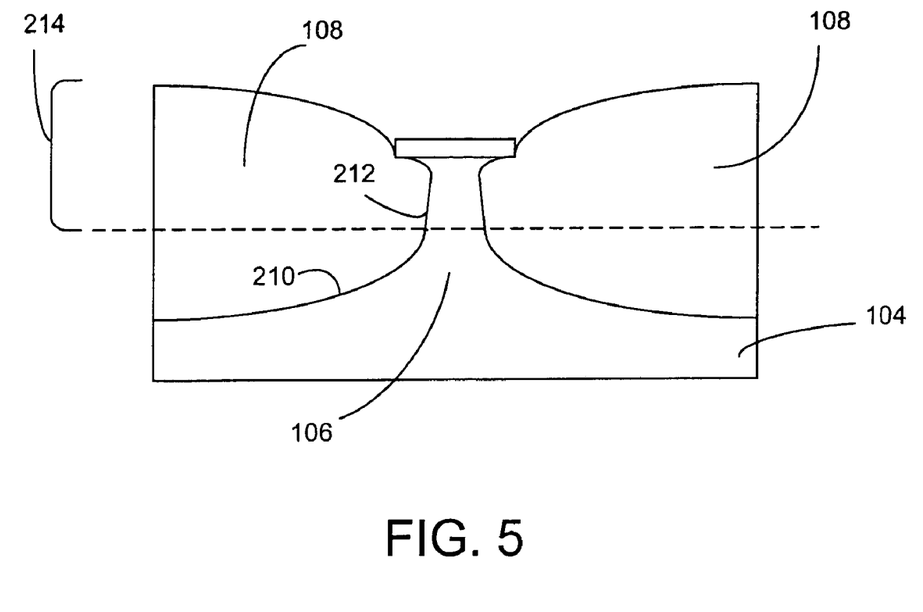
FIG. 5 is an illustration of the structure following the growth of an oxide region.

Referring to FIG. 5, a silicon dioxide isolation region 108 may be grown. thermally by exposing the substrate 104 to either wet oxidation (e.g., water steam) or dry oxidation (e.g., oxygen gas). When the oxide growth is completed, the resulting isolation region 108 fills the portion of the substrate 104 that was etched away. As a result of various factors effecting oxide growth rate, unmasked portions of the substrate are removed, resulting in a surface 210 and sidewall 212 that are somewhat rounded.

Figure 6:
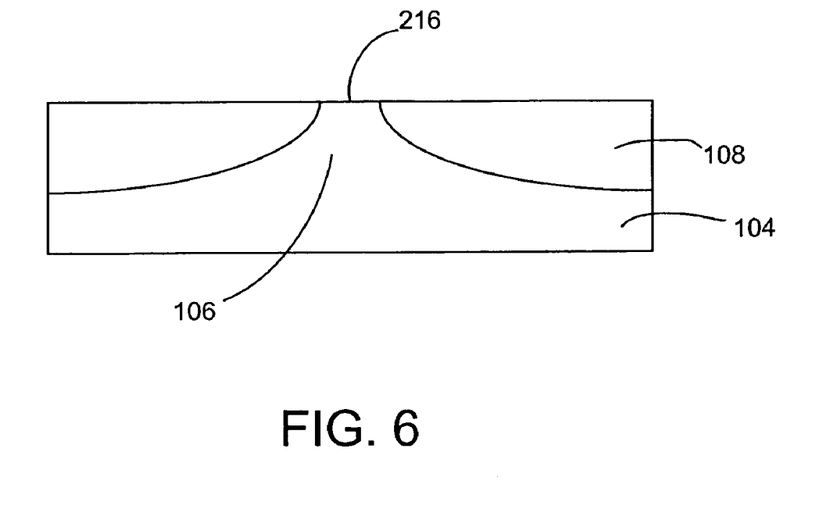
FIG. 6 is an illustration of the structure following planarization.

Referring additionally to FIG. 6, after the isolation region 108 has been grown, the isolation region 108 and the active region 106 are planarized. A chemical mechanical polishing (CMP) process may be used to remove portions 214 of the active region 106 and isolation region 108. The CMP process generates a substantially planar surface 216. At this stage of the process, the active region 106 has a volcano-like geometry. Thus, the active device region 106 has a wide base portion that quickly narrows into a neck at the planar surface 216.

Figure 7:
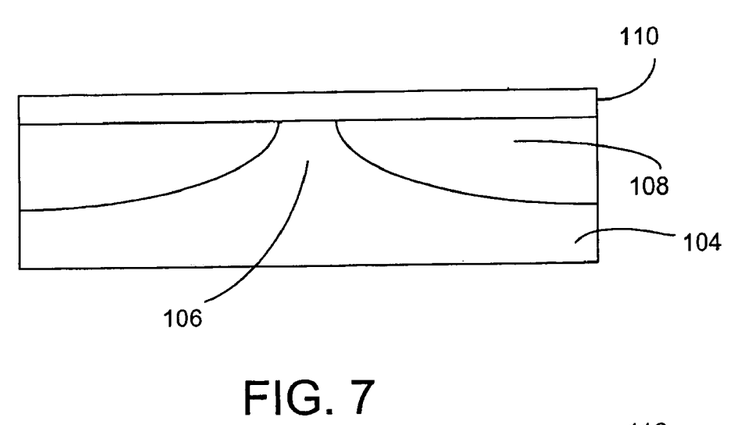
FIG. 7 is an illustration of the structure following deposition of a semiconductor layer on the planarized structure.

Referring to FIG. 7, a polysilicon layer 110 is formed atop the planarized structure by a chemical vapor deposition (CVD) process. The polysilicon layer 110 may have a thickness of approximately 0.01 to 2 micrometers.

Figure 8:
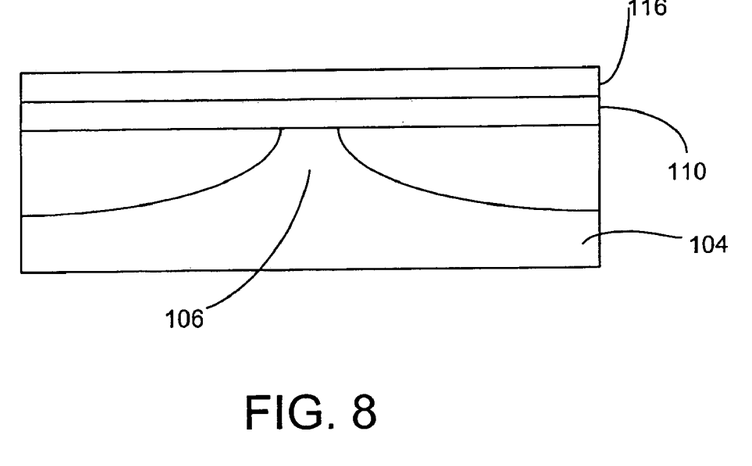
FIG. 8 is an illustration of the structure following deposition of an emission electrode on the semiconductor layer.

Referring to FIG. 8, an emission electrode 116 is formed on the semiconductor layer 110 by depositing, for example, a chromium layer having a thickness range of approximately 0.1 to 1 micrometer.

Figure 9:
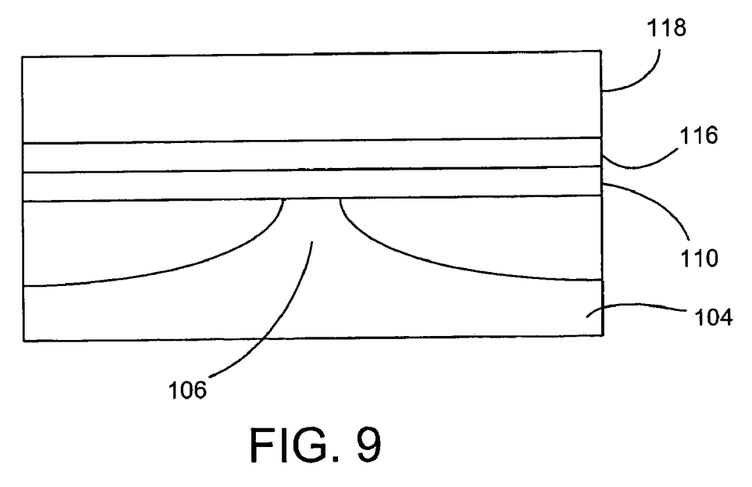
FIG. 9 is an illustration of the structure following deposition of an oxide layer on the emission electrode.

Referring to FIG. 9, a silicon oxide ($SiO_x$) insulating layer 118 is formed on the emission electrode 116 by, for example, a CVD TEOS (tetraethoxysilane) oxide deposition. After the deposition of the insulating layer 118, the insulating layer 118 may be planarized by CMP to a thickness of approximately 0.01 to 2 micrometers.

Figure 10:
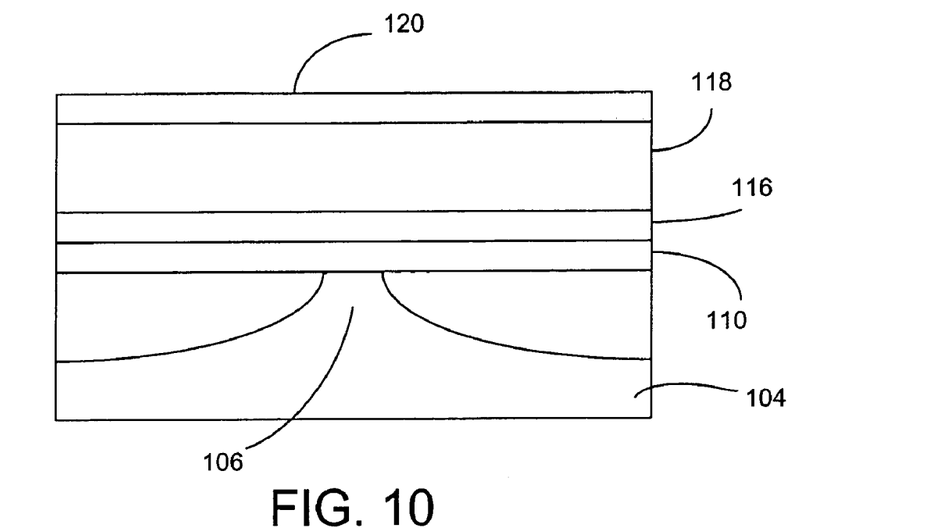
FIG. 10 is an illustration of the structure following deposition of a lens electrode on the oxide layer.

Referring to FIG. 10, a lens electrode 120 is formed on the insulating layer 118 by depositing, for example, a chromium layer having a thickness of approximately 0.01 micrometer to 1 micrometer and preferably 0.1 micrometer.

Figure 11:
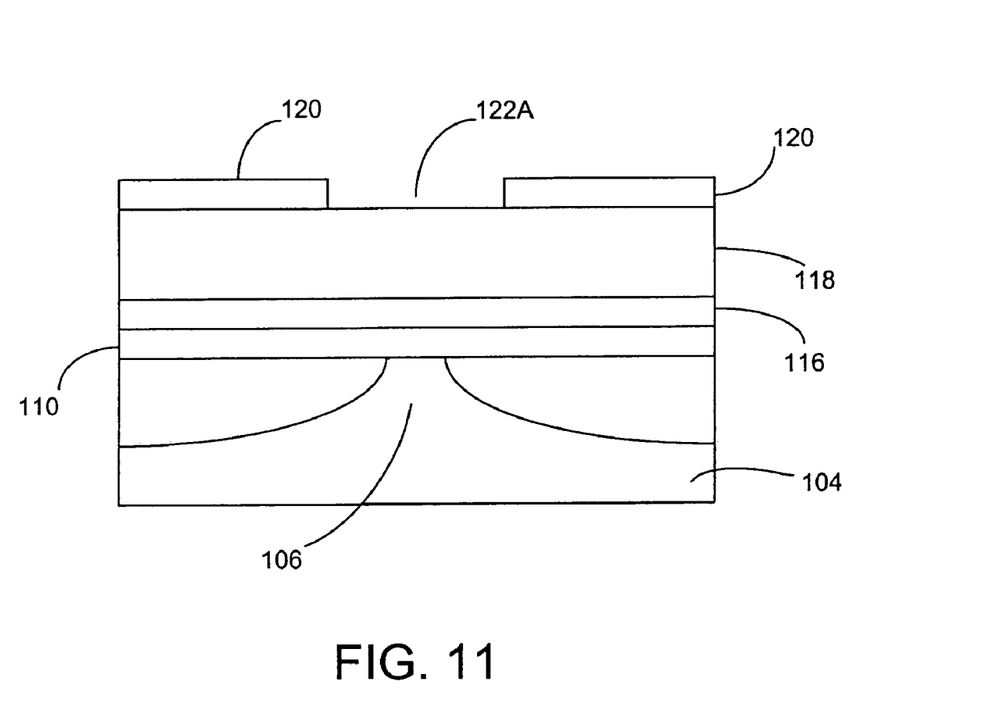
FIG. 11 is an illustration of the structure following etching of an aperture in the lens electrode.
Figure 12:
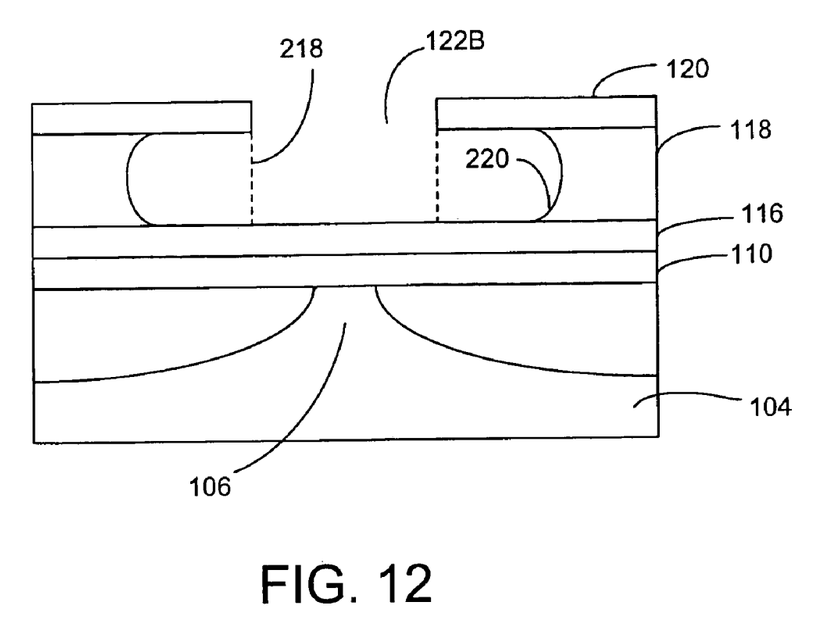
FIG. 12 is an illustration of the structure following the formation of an undercut in the oxide layer.
Figure 13:
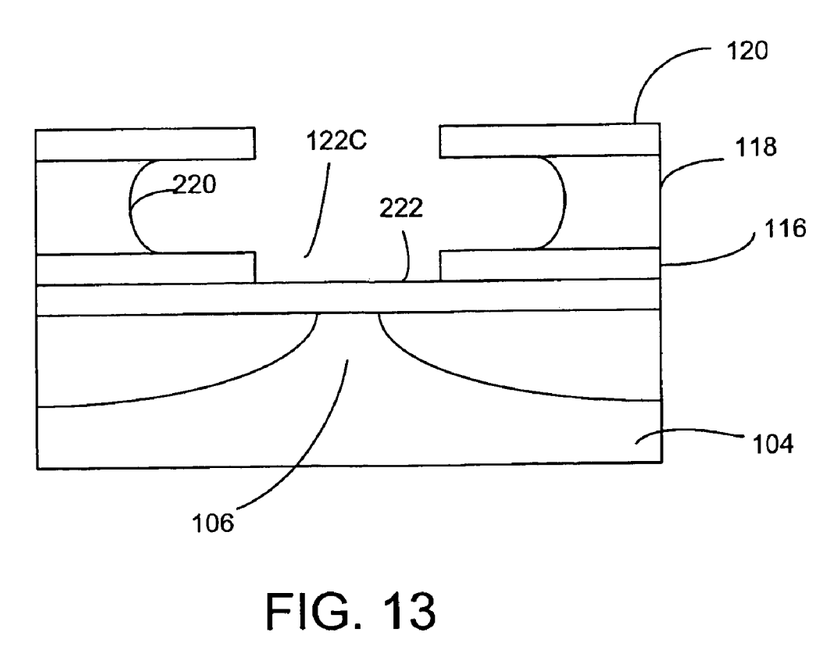
FIG. 13 is an illustration of the structure following an etching of an aperture in the emission electrode.

Referring to FIGS. 11 to 13, an electron lens opening 122 is formed by etching through the lens electrode 120, the insulating layer 118 and the emission electrode 116. The lens electrode 120 may be initially patterned and etched to form a first aperture 122A (FIG. 11). A dry etching process such as ion beam milling may be used to etch the lens electrode 120. The first aperture 122A may have a diameter of several micrometers and preferably two micrometers.

A two-step etching process may be used to form a second aperture 122B in the insulating layer 118 (FIG. 12). The two-step etching process may include a dry etch step followed by a wet etch step. For example, in the dry etch step, an RIE etch using $CHF_3$ etching agents may be utilized to form a sidewall 218 (shown in phantom) that is aligned with the first aperture 122A and that is substantially normal to the emission electrode 118. The wet etch process is applied to the sidewall 218 so as to etch and laterally recess the insulating layer 118. Resulting is an undercut wall 220 of the insulating layer 118. The wet etch process may be conducted using hydrofluoric acid-based buffered oxide etch.

The emission electrode 116 is then etched to form a third aperture 122C and hence expose a region 222 of the semiconductor layer 110 (FIG. 13). The third aperture 122C may have a diameter up to several micrometers and is substantially aligned with the first aperture 122A. A dry etching process may be used to etch the emission electrode 116. The exposed region 222, of the semiconductor layer 110 may be slightly etched to ensure that the semiconductor layer 110 is fully exposed.

The steps shown in FIGS. 12 and 13 may be reversed, whereby the aperture 122C is formed before the undercut wall 220.

Figure 14:
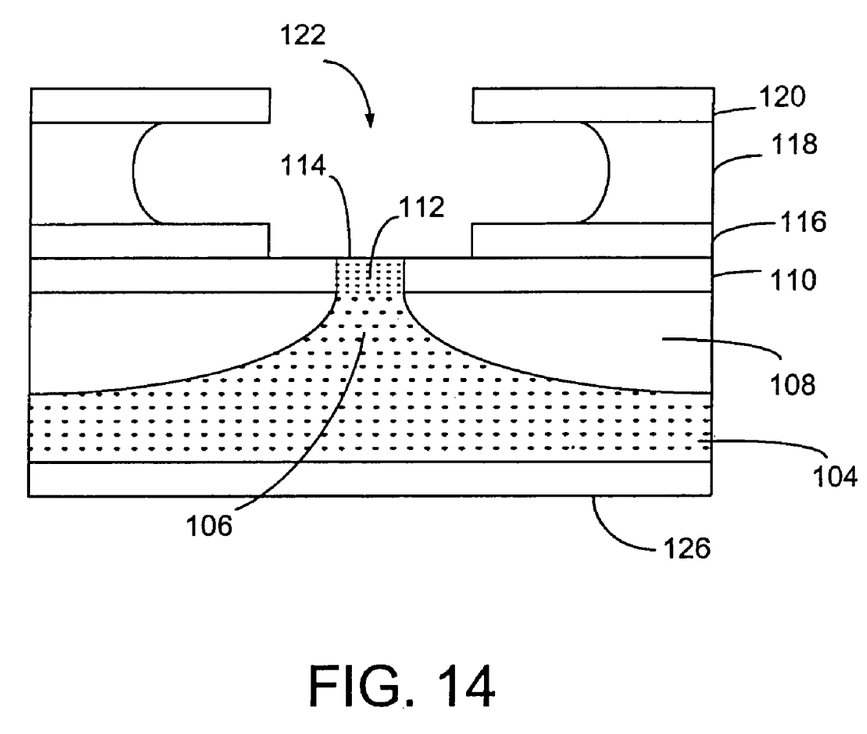
FIG. 14 is an illustration of the structure following the formation of a porous region in the exposed semiconductor layer.

Referring now to FIG. 14, the porous region 112 is formed in the semiconductor layer 110. Porosity may be induced into the semiconductor layer 110 by an anodic treatment process as described by Xia Sheng, Hideki Koyama and Nobuyoshi Koshida in "Efficient surface-emitting cold cathodes based on electro luminescent porous silicon diodes," J. Vacuum Science Technology B 15(2) March/April, 1998, pp 793–95. By controlling the current density and the anodization time, the porosity rate in the porous region 112 may be controlled.

After the porous region 112 has been formed, the conductive layer 124 may be added. The conductive layer 124 may conformally cover the emission region 114 and the emission electrode 116 as well as the lens electrode 120. A conductive layer 124 made of carbon may have a thickness of approximately 10 nanometers. Consistent with FIG. 1, the first portion 124*a* of the conductive layer 124 covers the emission site 114 and portions of the emission electrode 116, and the second portion 124*b* of the conductive layer 124 covers the lens electrode 120.

Figure 15:
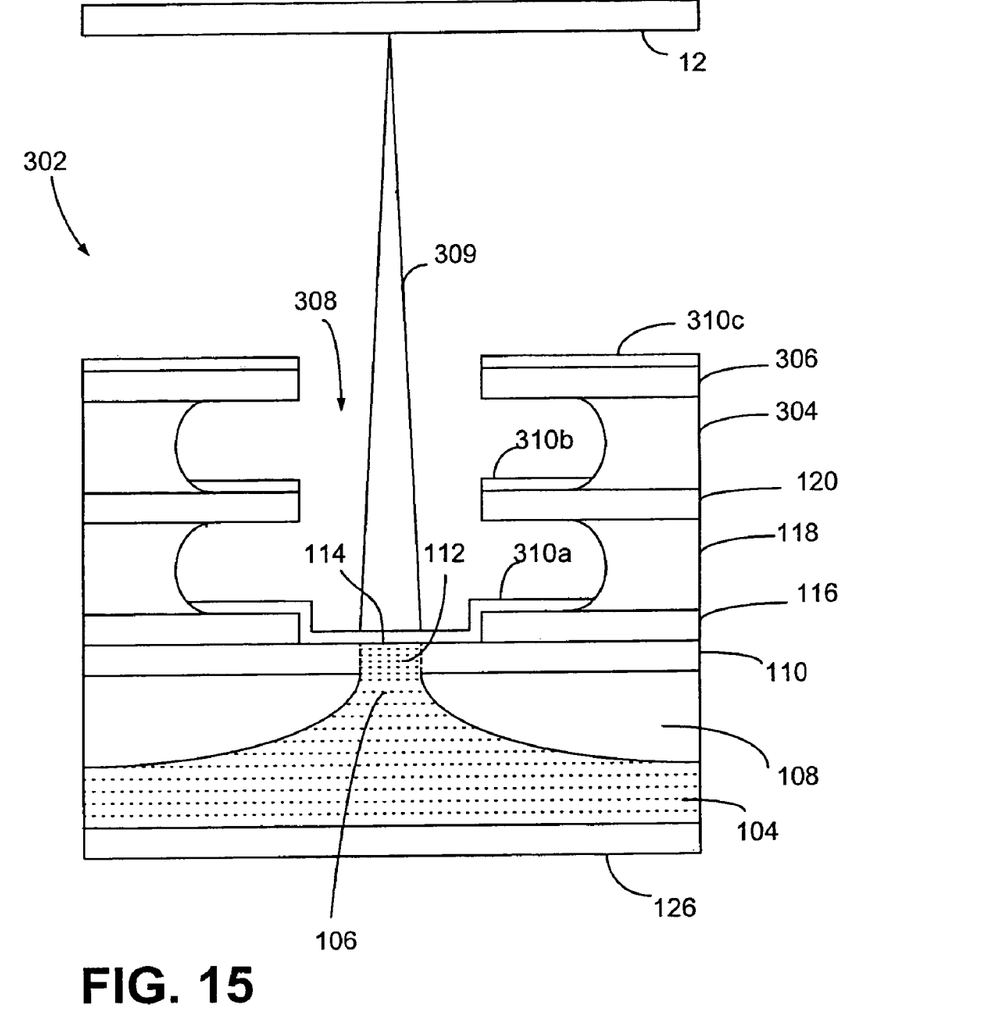
FIG. 15 is an illustration of another electron source in accordance with the present invention.

FIG. 15 shows a second (alternative) electron source 302. The second electron source 302 also includes a substrate 104, an active region 106, an insulating region 108, a semiconductor layer 110, a porous region 112, an emission region 114 and an emission electrode 116. The second electron source 302 further includes a first insulating layer 118, a first lens electrode 120, a second insulating layer 304 on first lens electrode 120 and a second lens electrode 306 on the second insulating layer 304.

An opening 308 exposes the emission region 114. Both the first and second insulating layers 118 and 304 may be recessed to avoid contact with an electron beam 309 emitted from the electron source 302. The emission region 114 and the electrodes 116, 120 and 306 may be covered by a conductive coating. For the structure shown in FIG. 15, a first portion 310*a* of the conductive coating covers the emission region 114 and a portion of the emission electrode 116, a second portion 310*b* of the conductive coating covers the first lens electrode 120 and a third portion 310*c* of the conductive coating covers the second lens electrode 306.

Control or focus of the electron beam 309 may be advantageously provided by applying different operating potentials to the lens electrodes 120 and 306.

Thus disclosed are electron sources 102 and 302 that are easier and less expensive to fabricate than Spindt emitters. The electron sources 102 and 302 can be focused in a temporally and spatially stable manner, and they are operable in a poor vacuum. The thin conductive layer can also reduce scattering, thereby reducing energy spread and increasing efficiency.

The substrates of the electron sources are not limited to silicon. Other semiconductor materials may be used. A metal may even be used, whereby a semiconductor layer is formed on the metal substrate.

Dimensions of the electron sources are device-specific. Voltages applied to the electrodes are also device-specific.

The fabrication of the electron sources is not limited to the steps described in connection with FIGS. 3 to 14. Other techniques may be used to deposit, planarize, etc. Other materials can be used for the electrodes, conductors, insulators, etc.

The emission region may be patterned in ways other than forming a broad-based active region that narrows into a neck, and forming a porous region over the neck. However, such patterning offers certain advantages. The broad base dissipates heat for better thermal management.

Figure 16:
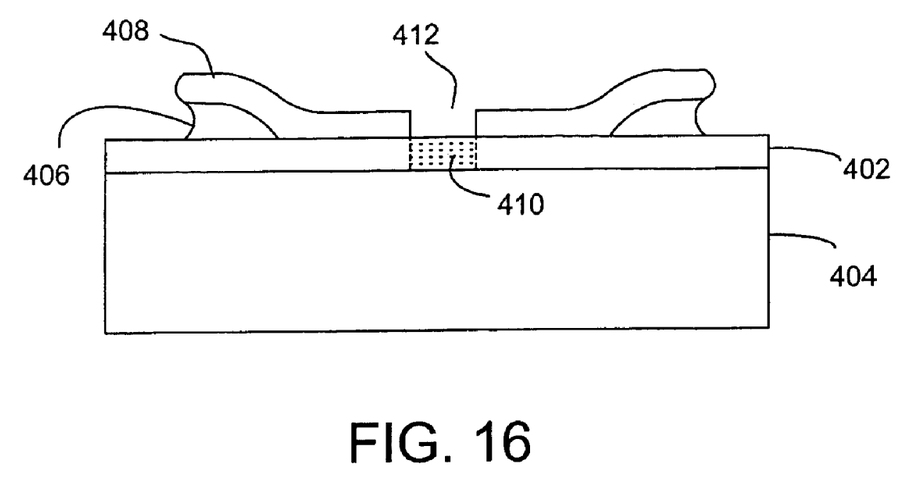
FIG. 16 is an illustration of yet another electron source in accordance with the present invention.

An alternative pattern is shown in FIG. 16. A polysilicon layer 402 is formed atop an active $n^{++}$ substrate 404, an insulating layer 406 is grown on the substrate 404, and a patterning mask 408 is formed atop a surface of the polysilicon layer 402 and the insulating layer 406. A porous region 410 is located in the polysilicon layer 402. An opening in the patterning mask 408 defines an emission region 412, and an emission electrode (not shown) covers the patterning mask 408. The patterning mask 408 may be made of a metal or a dielectric.

Figure 17:
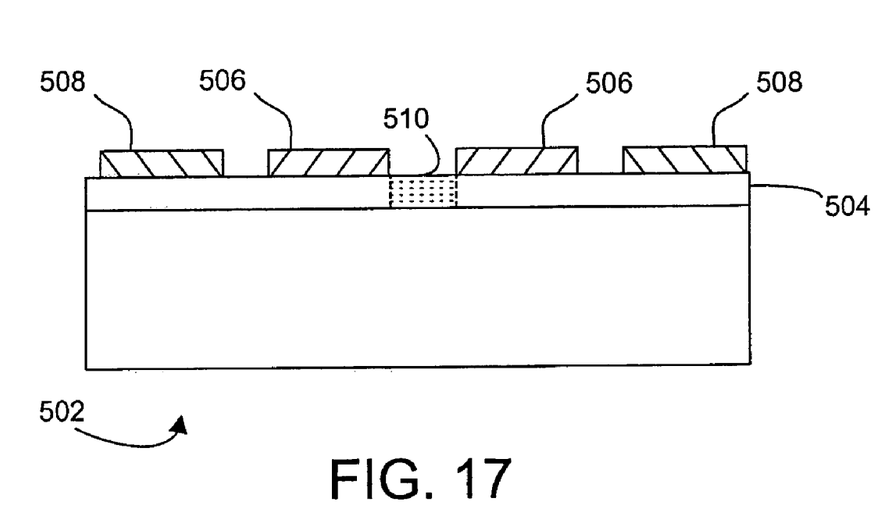
FIG. 17 is an illustration of an alternative focusing structure for an electron source in accordance with the present invention.

The focusing structures are not limited to stacked electrodes that are separated by insulating layers. For example, FIG. 17 shows a focusing structure 502 including an emission electrode 506 and a lens electrode 508 on a polysilicon layer 504. The lens electrode 508 surrounds the emission electrode 506, and an opening in the emission electrode 506 exposes the emission region 510.

The electron source is not limited to the electron emission structure described above. Electron emission from planar surfaces can be achieved though various techniques. The electron source may include a thermionic emission structure, which emits electrons through a heating of the surface. Alternatively, electrons can be emitted from the surfaces of metal-insulator-metal (MIM) and metal-insulator-oxide (MIS) structures at room temperature or below. This type of electron emission is described in Wade & J Briggs, "Low noise Beams from Tunnel Cathodes", *Journal of Applied Physics* 33, No. 3, pp. 836–840, 1962; Julius Cohen, "Tunnel Emission into Vacuum", Applied *Physics Letters* 1, No. 3, pp. 61–62, 1962; and Yokoo, et al, "Emission characteristics of metal-oxide-semiconductor electron tunneling cathode", *Journal of Vacuum Science and Technology*, pp. 429–432, 1993). Electrons from MIM and MIS structures are emitted into the vacuum with small divergence angles as described in R. Hrach, *Thin Solid Films* 15, p. 15, 1973. Small divergence angles allow the emitted electrons to be focused into small diameter electron beams.

Figure 18:
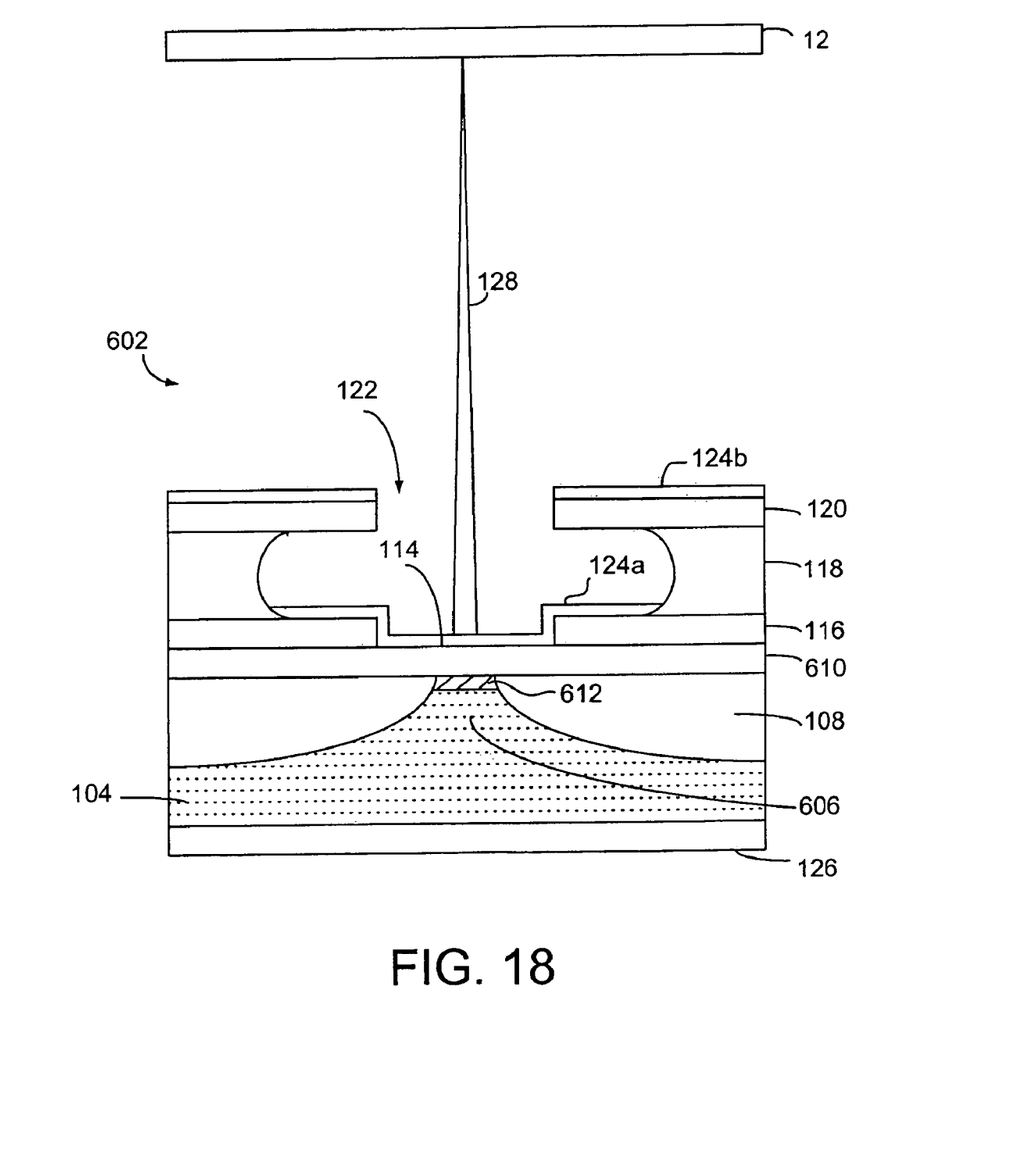
FIGS. 18 and 19 are illustrations of other electron sources in accordance with the present invention.

FIG. 18 shows an electron source 602 including a metal-insulator-metal (MIM)-based electron emission structure. A thin metal layer 612 is between an insulator 610 and the active region 606. Thus the metal-insulator-metal corresponds to the electrode 124a, the insulator 610 and the thin metal layer 612.

Figure 19:
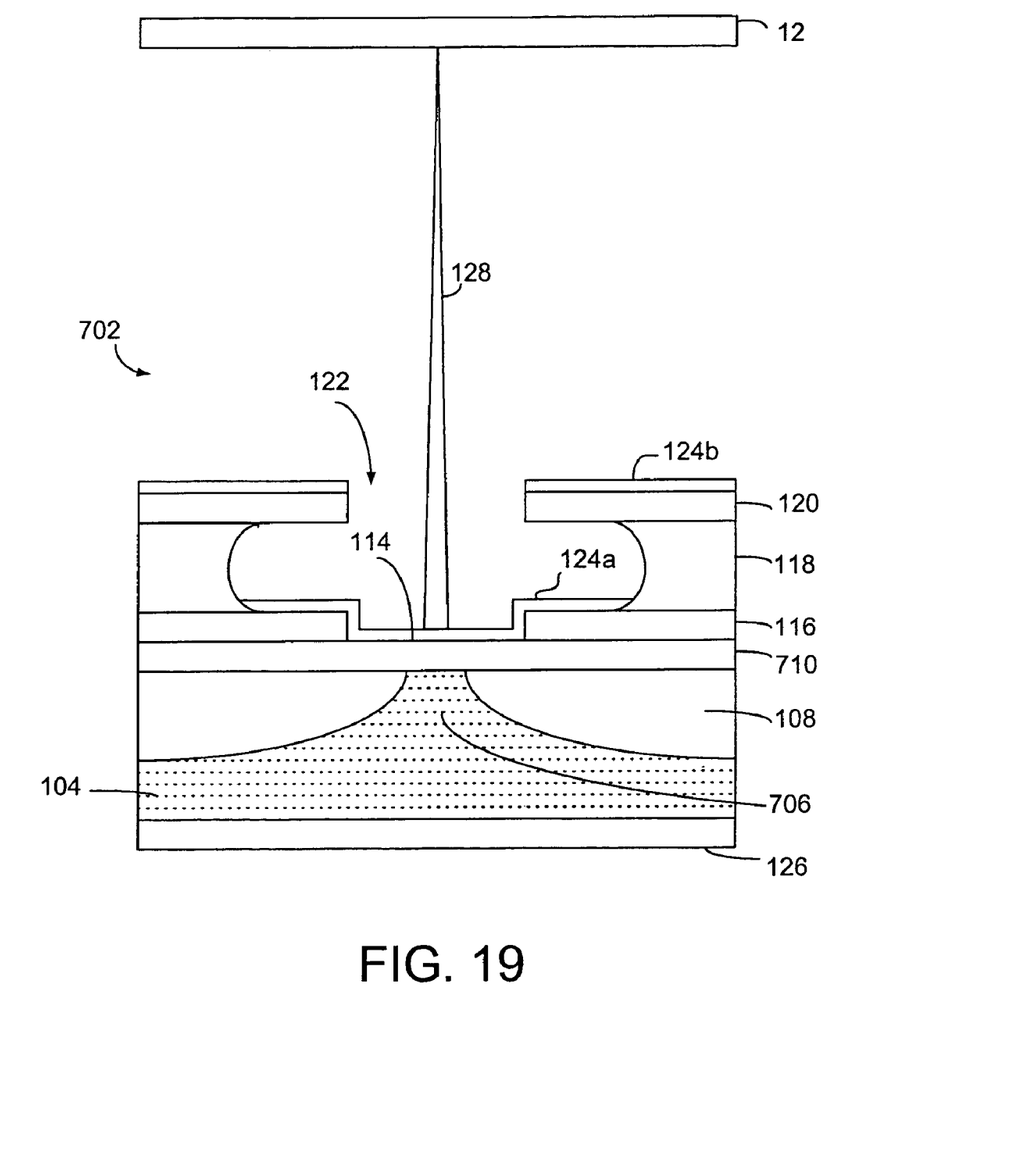

FIG. 19 shows an electron source 702 including a metal-insulator-semiconductor (MIS)-based electron emission structure. The active region extends to the insulator 710. Thus the metal-insulator-semiconductor corresponds to the electrode 124a, the insulator 710 and the active region 706.

The above paragraphs describe the structure and fabrication of a single electron source. It is understood, however, that multiple electron sources may be fabricated simultaneously on a single chip and that multiple chips may be fabricated simultaneously on a single wafer.

The electron sources 102 and 302 may be used in a variety of applications. Exemplary applications include data information storage devices, electron beam inspection tools (e.g., SEM), lithography and image display. Such sources can produce ultra small storage bits in an information storage device, ultra-fine lines for lithography and ultra-small pixels of a cathode ray tube or raster display.

Although specific embodiments of the present invention have been described and illustrated, the present invention is not limited to the specific forms or arrangements of parts so described and illustrated. Instead, the present invention is construed according to the claims that follow.

What is claimed is:

1. An emission-focusing structure for an electron source, the source including a substrate, the structure comprising:
   an emission electrode on the substrate;
   a lens electrode on the substrate, the lens electrode surrounding the emission electrode, wherein the substrate has an emission region;
   wherein the electrode has an opening that exposes the emission region; and
   wherein the source further comprises a layer on the substrate, the layer including a planar porous silicon electron emission region; a patterning mask on a surface of the layer, and an opening in the patterning mask defining the emission region.

* * * * *